United States Patent Office 2,849,489
Patented Aug. 26, 1958

2,849,489

PRODUCTION OF 8-KETOTRICYCLODECANE

Karl Büchner, Duisburg-Hamborn, and Josef Meis, Oberhausen-Osterfeld, Germany, assignors to Ruhrchemie Aktiengesellschaft, Oberhausen-Holten, Germany, a German corporation No Drawing. Application April 19, 1954
Serial No. 424,278

Claims priority, application Germany May 8, 1953

6 Claims. (Cl. 260—586)

This invention relates to improvements in the production of 8-ketotricyclodecane.

It is known to produce keto compounds of tricyclodecane and tricyclodecene from the corresponding hydroxy compounds by treating the same with oxygen-evolving agents, as, for example, with chromic acid.

One object of this invention is a single-step method for the production of ketotricyclodecane from hydroxy tricyclodecene. This, and still further objects, will become apparent from the following description:

In accordance with the invention, ketotricyclodecane is produced from hydroxy tricyclodecene in a simple, single operational step by contacting the hydroxy tricyclodecene at increased temperature with a dehydrogenating-hydrogenating catalyst. The hydrogen which by means of the catalyst is liberated in the 8-position is at once added to the 4-5 double bond before a recombination of the atomic hydrogen to molecular hydrogen occurs.

The starting hydroxy tricyclodecene has been described in the literature (see Bruson and Riener, Journal of the American Chemical Society, vol. 67 (1945), pp. 723–728, and/or Bergman and Japhe, Journal of the American Chemical Society, vol. 69 (1947), pp. 1826–1827) and may be designated tricyclo-(5,2,1,0$^{2,6}$)-decene-(4)-ol-8, and, as indicated, has the hydroxy group in the 8-position and an unsaturated double bond between the 4 and 5 position.

The catalyst used in accordance with the invention may be any known catalyst having a dehydrogenating and hydrogenating action, such as metals of the 8 and/or first group of the periodic system, which may, if desired, be activated by oxides of metals of the second and 6 group, respectively, of the periodic system. These catalysts may be deposited on inert carrying materials, such as kieselguhr.

The catalysts, thus, for example, may be Raney nickel or cobalt catalysts, as are used, for example, in the Fischer-Tropsch synthesis. It is, however, preferable to use a nickel-magnesia-kieselguhr catalyst, as with a catalyst of this type a conversion of more than 90% at 230° C. may be obtained in as little as two hours. With this catalyst, a ketotricyclodecane is formed, which has hydroxyl numbers and iodine numbers of below 10 units. The content of ketotricyclodecene is about 1–2%, while the same quantity of hydroxytricyclodecane is formed.

The best catalysts which have been found for the rearrangement in accordance with the invention, is a nickel-copper-magnesia-kieselguhr catalyst, which contains 100 parts of copper, 15 parts of magnesia, and 200 parts of kieselguhr per 100 parts of nickel. The use of this catalyst at 230° C., while stirring and using a reflux condenser, will result in a product which contains only a residual hydroxyl number of as low as 3 and a residual iodine number of 2. The distillation of the raw product obtained with this catalyst results in a 92% yield of ketotricyclodecane which has the following characteristics:

| | |
|---|---|
| Density at 20° C | 1.051. |
| Refractive index $n_D^{20}$ | 1.5028. |
| Boiling range | 132° C. at 30 mm.; 240° C. at 760 mm. |
| Pour point | −69° C. |
| Flash point | 112° C. |
| Carbonyl number | 373. |
| Iodine color number | 0. |
| Coefficient of evaporation | 200 (benzene=1). |

The contacting with the catalyst may be effected at temperatures ranging between 140 and 240° C., and preferably between 200 and 240° C., and under any pressure. It is expedient to operate at pressures of 1–6 kg./square centimeter, but higher pressures may also be used. The catalysts are used in amounts of 2 to 10% by weight and preferably 3% by weight of the compound being reacted.

The contacting with the catalyst should preferably be effected in the absence of water, water vapor, sulfur, sulfur compounds, alkali, and materials having a dehydrating action.

If the conversion is effected in the presence of water or water vapor, the reaction proceeds with much poorer yields. Sulfur, or sulfur compounds, and alkalis and materials of a dehydrating action similarly have a disturbing effect on the rearrangement.

The keto compounds obtained by the conversion comprise ketotricyclodecane and/or mixtures of ketotricyclodecane and ketotricyclodecene.

The ketotricyclodecane may be designated as tricyclodecane-(5,2,1,0$^{2,6}$)-one-8. The ketotricyclodecene may be designated as tricyclo-(5,2,1,0$^{2,6}$)-decene-4-one-8.

The enol form which is, for example, theoretically possible for the acetic acid ester is converted by water into the keto form to such an extent that only 0.4% of the enol form will continue to exist and the keto form is present with more than 99%. 8-hydroxy tricyclodecene, in contrast to this, cannot be converted into a keto form by the action of water because the particular double bond of the hydroxyl group to be rearranged is not in neighbouring position but positioned in another ring of the compound involved.

In contrast to this, the treatment of the hydroxy tricyclodecane with degreased copper powder for one hour at 220–230° C. with a reflux condenser, while shaking, results in the considerable ketonization. The conversion reaches about 90%. In addition to the ketotricyclodecane, ketotricyclodecene is also formed in about one and one-half times the quantity. This behaviour of the copper powder is based on the fact that finely divided copper exhibits more dehydrogenating than hydrogenating properties. Copper-chromium oxide catalysts are also usable for the ketonization of the hydroxy tricyclodecane, but always give rise to the formation of considerable quantities of ketotricyclodecene in addition to ketotricyclodecane. This ketotricyclodecene may in a second operational step be converted into ketotricyclodecane by the catalystic addition of water gas under high pressure.

The following examples are given by way of illustration and not limitation:

Example 1

30 cc. hydroxy tricyclodecene and 5 cc. very fine, degreased copper powder were placed into a 100 cc. round-bottomed flask provided with a reflux condenser, and heated for two hours at 235° C. while shaking. In doing so, the hydroxy tricyclodecene boiled with reflux. Thereafter, the copper powder was separated by filtration from a reaction product which had the following characteristics:

| | |
|---|---|
| Iodine number | 116 |
| Carbonyl number | 332 |
| Hydroxyl number | 45 |

These characteristics correspond to the following composition:

| | Percent |
|---|---|
| Ketotricyclodecane | about 32 |
| Hydroxy tricyclodecene | about 12 |
| Ketotricyclodecene | about 56 |

Example 2

30 cc. hydroxy tricyclodecene, in the apparatus described in Example 1, were shaken for two hours at 200° C. with 2 cc. of a copper-chromium oxide catalyst and thereafter separated from the catalyst. A product having the following characteristics was obtained:

| | |
|---|---|
| Iodine number | 108 |
| Carbonyl number | 247 |
| Hydroxyl number | 117 |

These characteristics indicated that the product consisted of about equal parts of ketotricyclodecane, ketotricyclodecene and hydroxy tricyclodecene.

Example 3

30 cc. hydroxy tricyclodecene, in the apparatus described in Example 1, were shaken for two hours at 220° C. with 5 cc. of a cobalt-magnesia-kieselguhr catalyst having a ratio of cobalt:magnesia:kieselguhr of 100:10:100. After the separation of the catalyst, a product was obtained which had the following characteristics:

| | |
|---|---|
| Iodine number | 38 |
| Hydroxyl number | 35 |
| Carbonyl number | 314 |

These characteristics indicated the presence of about 84% ketotricyclodecane.

Example 4

30 cc. hydroxy tricyclodecene, in the apparatus described in Example 1, were treated for two hours at 235° C. with 5 cc. of a reduced nickel-magnesia-kieselguhr catalyst (100:12:50) while shaking. After the separation of the catalyst, a reaction product was obtained which had the following characteristics:

| | |
|---|---|
| Carbonyl number | 344 |
| Hydroxyl number | 9 |
| Iodine number | 14 |

This indicated a content of about 92% ketotricyclodecane in the product.

Example 5

1500 cc. hydroxy tricyclodecene, together with 150 cc. of a reduced nickel-copper-magnesia-kieselguhr catalyst containing 100 parts of nickel, 100 parts of copper, 15 parts of magnesia, and 200 parts by weight of kieselguhr, were heated to incipient boiling in a round-bottomed flask of 2 liters capacity provided with a stirrer and a reflux condenser. A sample taken at this point had the following characteristics:

| | |
|---|---|
| Carbonyl number | 304 |
| Hydroxyl number | 57 |
| Iodine number | 25 |

After half an hour, the following characteristics were reached:

| | |
|---|---|
| Carbonyl number | 323 |
| Hydroxyl number | 35 |
| Iodine number | 16 |

After 1½ hours, the characteristics were as follows:

| | |
|---|---|
| Carbonyl number | 336 |
| Hydroxyl number | 24 |
| Iodine number | 11 |

After a total of 3 hours, the product had the following characteristics:

| | |
|---|---|
| Carbonyl number | 346 |
| Hydroxyl number | 3 |
| Iodine number | 2 |

This experiment indicated that the conversion reaction initially proceeds very rapidly. In this manner, a continuous conversion becomes possible, especially if a complete conversion is not aimed at, for the unconverted hydroxytricyclodecene, by fractionation, may be separated as after-fraction from the ketotricyclodecane and be used again for the conversion. If one is content to operate with a fixed-bed catalyst and a residence time of 20 minutes, then a conversion of 70–80% will be obtained.

Example 6

The reaction mixture used in Example 4 was shaken at 140° C. After 2 hours, a reaction product was obtained which had the following characteristics:

| | |
|---|---|
| Carbonyl number | 145 |
| Hydroxyl number | 220 |
| Iodine number | 94 |

These figures indicate that about 40% of the hydroxytricyclodecene used as the starting material were converted into ketotricyclodecane.

Example 7

30 cc. hydroxytricyclodecene, in the manner described in the preceding examples, were treated with 5 cc. of a reduced iron catalyst. This iron catalyst had been prepared from a solution of iron nitrate and calcium nitrate containing 23 grams Fe and 7.5 grams CaO by precipitation with soda at a pH value of 8 while stirring in 41 grams of kieselguhr; drying the moist precipitate, molding the same to small cylinders of 2 mm. in diameter and 4 mm. in length, and reducing the catalyst at 400° C. with hydrogen. The mixture of hydroxytricyclodecene and the catalyst was shaken for 2 hours at 240° C. resulting in a reaction product which had the following characteristics:

| | |
|---|---|
| Carbonyl number | 10 |
| Hydroxyl number | 360 |
| Iodine number | 165 |

3% of the hydroxytricyclodecene charged had been converted into ketotricyclodecane in this case.

We claim:

1. Process for the keto conversion of tricyclo-(5,2,1,0$^{2,6}$)-decene-(4)-ol-8 which comprises contacting at a temperature between about 100–250° C., tricyclo-(5,2,1,0$^{2,6}$)-decene-(4)-ol-8 with a dehydrogenating-hydrogenating catalyst selected from the group consisting of metals of the 8th group and metals of the 1st and 8th group of the periodic system activated with a metal oxide of the 2nd group of the periodic system, and recovering the tricyclodecane-(5,2,1,0$^{2,6}$)-one-8 formed.

2. Process according to claim 1, in which said contacting is effected at a temperature between about 200°–240° C.

3. Process according to claim 1, in which said catalyst is deposited on an inert carrier material.

4. Process according to claim 3, in which said inert carrier material is kieselguhr.

5. Process according to claim 1 in which said catalyst is a nickel magnesia kieselguhr catalyst.

6. Process according to claim 1, in which said contacting is effected in the substantial absence of water, water-vapour, sulfur, sulfur compounds, alkalis and materials of dehydrating action.

References Cited in the file of this patent

UNITED STATES PATENTS

| | | |
|---|---|---|
| 2,560,361 | Morrell et al. | July 10, 1951 |
| 2,588,359 | Chitwood et al. | Mar. 11, 1952 |

FOREIGN PATENTS

| | | |
|---|---|---|
| 672,870 | France | Sept. 23, 1929 |